United States Patent [19]

Hamada et al.

[11] Patent Number: 5,010,971
[45] Date of Patent: Apr. 30, 1991

[54] STEERING SYSTEM FOR VEHICLES

[75] Inventors: Tetsuro Hamada, Tochigi; Shoichi Sano, Tokyo; Yoshimi Furukawa, Tochigi, all of Japan

[73] Assignee: Honda Giken Kogyo Kabushiki Kaisha, Tokyo, Japan

[21] Appl. No.: 189,657

[22] Filed: May 3, 1988

Related U.S. Application Data

[63] Continuation-in-part of Ser. No. 690,167, Jan. 10, 1985, Pat. No. 4,964,401, and a continuation-in-part of Ser. No. 684,613, Dec. 21, 1984, Pat. No. 4,971,175.

[30] Foreign Application Priority Data

Dec. 23, 1983 [JP] Japan ................... 58-243354
Dec. 23, 1983 [JP] Japan ................... 58-243355

[51] Int. Cl.$^5$ ............................................. B62D 5/06
[52] U.S. Cl. ............................... 180/140; 180/142; 180/236; 364/424.01
[58] Field of Search .............. 180/140, 141, 142, 234, 180/236; 364/424.01

[56] References Cited

U.S. PATENT DOCUMENTS

| | | | |
|---|---|---|---|
| 4,105,086 | 8/1978 | Ishii et al. | 180/79 |
| 4,313,514 | 2/1982 | Furukawa et al. | 180/143 |
| 4,372,407 | 2/1983 | McColl | 180/140 |
| 4,373,603 | 2/1983 | Nelson | 180/140 |
| 4,412,594 | 11/1983 | Furukawa et al. | 180/142 |
| 4,417,128 | 9/1984 | Nakayama et al. | 180/142 |

FOREIGN PATENT DOCUMENTS

| | | | |
|---|---|---|---|
| 53-40929 | 4/1978 | Japan | 180/140 |
| 2153311 | 8/1985 | United Kingdom | 180/140 |

Primary Examiner—Andres Kashnikow
Assistant Examiner—Eric Culbreth
Attorney, Agent, or Firm—Irving M. Weiner; Joseph P. Carrier; Pamela S. Burt

[57] ABSTRACT

A steering system (1) for vehicles including a front wheel steering mechanism (1a) for steering front wheels (5) at an angle in accordance with a steering operation of a driver, and a rear wheel steering mechanism (1b) for steering rear wheels (11) at an angle (Sr) in accordance with a travelling state of the vehicle.

For the steering of the rear wheel, a reference steering angle (Ar) according to a turning state of the vehicle and a corrective steering angle (Ac) according to a velocity derivative thereof are computed, and the steering angle (Sr) of the rear wheel is obtained by making either an addition or a subtraction of the reference and corrective steering angles at least in accordance with the velocity derivative.

5 Claims, 4 Drawing Sheets

STEERING SYSTEM FOR VEHICLES

This application is a continuation-in-part of U.S. patent application Ser. No. 684,613 now U.S. Pat. No. 4,971,175 filed Dec. 21, 1984, and is also a continuation-in-part of U.S. patent application Ser. No. 690,167 now U.S. Pat. No. 4,964,401 filed Jan. 10, 1985.

BACKGROUND OF THE INVENTION

1. Field of the Invention

The present invention relates generally to a steering system for vehicles. More particularly, the invention relates to a steering system for a vehicle with a front wheel and a rear wheel, of the type which includes a front wheel steering mechanism for steering the front wheel according to a steering operation of a driver and a rear wheel steering mechanism for steering the rear wheel according to a travelling state of the vehicle.

2. Description of the Relevant Art

There have already been proposed various steering systems for vehicles with front wheels and rear wheels, such as four-wheeled motor vehicles; an exemplary steering system of this type being disclosed in U.S. Pat. No. 4,412,594. Each such steering system includes a front wheel steering mechanism for steering the front wheels at an angle in accordance with a steering operation of a driver of the vehicle and a rear wheel steering mechanism for steering the rear wheels at an angle in accordance with a travelling state of the vehicle.

By virtue of such a steering system, both the turning characteristics and the steering responsiveness of vehicles can be greatly improved.

Generally, vehicles such as four-wheeled motor vehicles have the attendant problem that, when a decelerating operation is performed while turning, especially when beginning turning, the vehicle tends to have decreased lateral forces of the rear wheels thereof, thus resulting in a fish-tailing motion or the like.

Moreover, for an accelerating operation to be performed during turning travel of such vehicles, particularly in the latter half thereof, a desideratum has developed for facilitating the accelerating operation during turning travel, such as along a blind curve.

The present invention effectively overcomes such difficulties associated with conventional steering systems for vehicles, while fulfilling the aforesaid desideratum.

SUMMARY OF THE INVENTION

The present invention provides a steering system for a vehicle with a front wheel and a rear wheel, including a front wheel steering system for steering the front wheel at an angle in accordance with a steering operation of a driver of the vehicle and a rear wheel steering mechanism for steering the rear wheel at an angle in accordance with a travelling state of the vehicle. The steering system not only provides excellent vehicle turning characteristics and steering responsiveness but also provides control of the rear wheel so as to prevent the occurrence of a fish-tailing motion or the like, even during a decelerating operation while the vehicle is turning, as well as facilitating an accelerating operation during turning travel of the vehicle.

According to the present invention, there is provided a steering system for a vehicle with a front wheel and a rear wheel, comprising a front wheel steering mechanism for steering the front wheel at an angle in accordance with a steering operation of a driver of the vehicle, and a rear wheel steering mechanism for steering the rear wheel, the rear wheel steering mechanism having a first detection means for detecting a turning state of the vehicle, a first process means for processing a detection signal of the first detection means to provide steering data for the rear wheel corresponding to the turning state, a second detection means for detecting a velocity derivative of the vehicle, a second process means for processing a detection signal of at least the second detection means to provide correction data for the steering of the rear wheel, the correction data representing a correction quantity and a correction direction both corresponding to the velocity derivative, and an actuation means for actuating the rear wheel at an angle in accordance with both the steering data and the correction data.

The above and further objects, details and advantages of the present invention will become apparent from the following detailed description of the preferred embodiments of the invention when read in conjunction with the accompanying drawings.

DETAILED DESCRIPTION OF PREFERRED EMBODIMENTS

Figure 1:
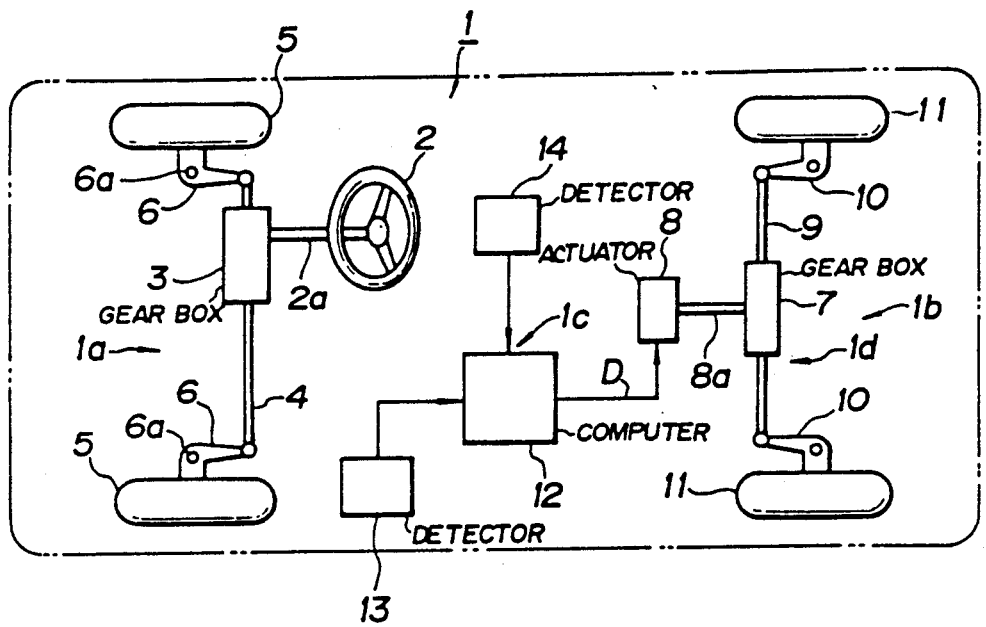
FIG. 1 is a plan view schematically showing the constitution of a steering system for vehicles according to an embodiment of the invention.

There will be described hereinbelow a preferred embodiment of the invention and a modified example thereof, with reference to the accompanying drawings, wherein like parts are designated by like reference characters.

Referring first to FIG. 1, designated at reference numeral 1 is the entirety of a steering system provided in a vehicle as shown by dashed line. The steering system 1 comprises a front wheel steering mechanism 1a for steering a pair of front wheels 5, 5 at an angle Sf in accordance with a steering operation that a driver (not shown) of the vehicle makes through a steering wheel 2, from the neutral position of FIG. 1 corresponding to a straight travelling state of the vehicle, and a rear wheel steering mechanism 1b for steering a pair of rear wheels 11, 11 at an angle Sr in accordance with a travelling state of the vehicle, from the neutral position of FIG. 1 corresponding to the straight travelling state.

The steering wheel 2 for the steering operation of the driver has an angular displacement corresponding to the amount of the operation, which angular displacement is transmitted through a steering shaft 2a to a gear (not shown) such as of a rack and pinion type in a gear box 3, where it is converted into a transverse displacement of a front tie rod 4. The tie rod 4 has at both ends thereof either of a pair of front knuckle arms 6, 6 pivotably connected thereto at one end thereof, which arms 6, 6 are pivotable about a pair of pivot points 6a, 6a, respectively. Each front wheel 5 supported by the other end of the knuckle arm 6 is therefore steerable by an angle corresponding to the transverse displacement of the tie rod 4, in the steering direction of the steering wheel 2.

On the other hand, the rear wheel steering mechanism 1b includes a control part 1c for determining the rear wheel steering angle Sr in accordance with the travelling state of the vehicle, the control part 1c outputting a control signal D, and an actuating part 1d for actuating to steer the rear wheels 11, 11 at the angle Sr, following the control signal D. More particularly, in accordance with the signal D, a servo-actuator 8 makes an angular displacement, which is transmitted through a shaft 8a to a gear (not shown) such as of a rack and pinion type in a gear box 7, where it is converted into a transverse displacement of a rear tie rod 9, whereby, through a pair of rear knuckle arms 10, 10, the rear wheels 11, 11 are caused to be steered in a manner similar to that in the front wheel steering mechanism 1a.

The control part 1c of the rear wheel steering mechanism 1b is constituted by a detection system comprising a turning state detector 13 for detecting a turning state Ts of the vehicle and a velocity derivative detector 14 for detecting a velocity derivative Vd of the vehicle, that is, an acceleration and deceleration thereof, and by a microcomputer system 12 for computing the rear wheel steering angle Sr on the basis of signals from the detection system, to output the control signal D to the actuator 8. This embodiment employs as the turning state detector 13 a front wheel steered angle sensor, which includes a potentiometer to detect a turning state Ts in the form of a voltage value corresponding to the front wheel steered angle Sf, and as the velocity derivative detector 14 an unshown sensor adapted to detect a derivative of the revolution speed of an axle (not shown). However, it is also contemplated that there may be employed as the turning state detector 13 a lateral acceleration sensor, a yawing rate sensor or any suitable element adapted for detecting the lateral acceleration or the angular velocity about the center of gravity of the vehicle, and as the velocity derivative detector 14 any suitable element adapted for detecting the acceleration and/or deceleration of the vehicle.

Figure 2:
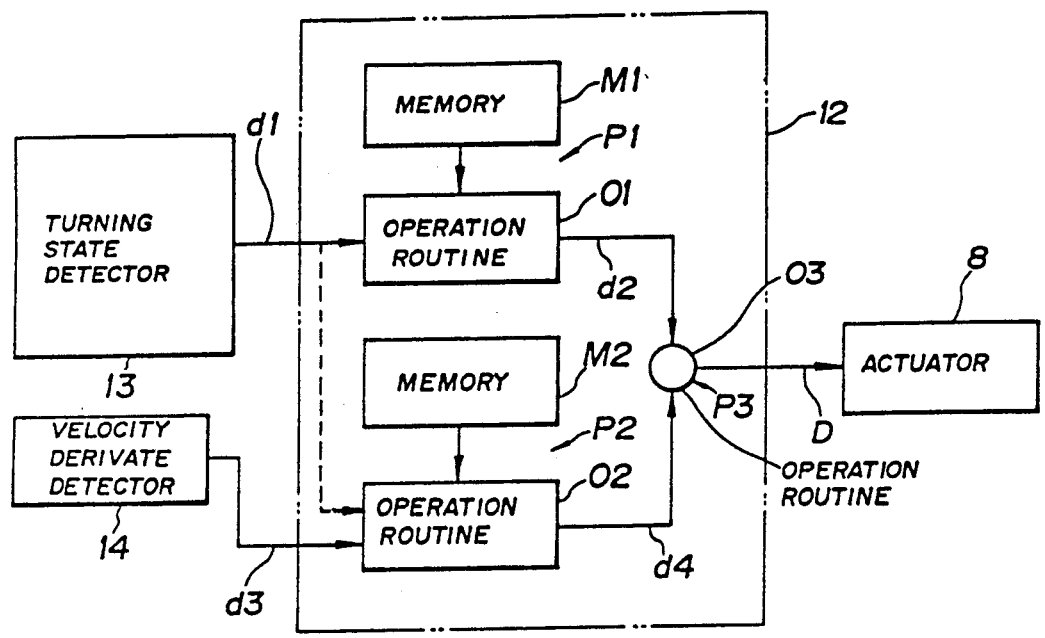
FIG. 2 is a functional block diagram of a control part of the steering system of FIG. 1.

Referring now to FIG. 2, the turning state detector 13 has detected the value Ts representative of the turning state of the vehicle output as a detection signal d1 therefrom. The signal d1 is passed to a first process function P1 of the computer 12, where it is processed on the basis of data on various turning states stored in a memory M1, following an operation routine O1, to determine a reference steering angle Ar of the rear wheels 11 corresponding to the detection signal d1. Then, data on the angle Ar are given in the form of a data signal d2 to be sent through a later-described third process function P3 and hence, when no velocity derivative is detected, solely to the actuator 8. The reference steering angle Ar is given as a steering amount from the neutral position of the rear wheels 11, and is assigned to have a positive (+) value when it is intended to have the same direction as the front wheel steering angle Sf as represented by the state value Ts and a negative (−) value when the intended direction is opposite thereto. At the actuator 8, such data are processed, for example, through a digital to analog conversion process followed by an amplification stage, to rotate, in a motor-driving manner or the like, the shaft 8a for steering the rear wheels 11.

More particularly, the voltage value Ts, as detected by the turning state detector 13, is passed through an interface circuit to a first process function P1 of the computer 12 as the detection signal d1. The signal d1 is digitized through an analog to digital converter and from this signal d1, an absolute address in the memory M1 is determined through the processing circuit in the operation routine O1.

In the memory M1, addresses concerning the steered angle Sf of the front wheels and data concerning the reference steering angle Ar of the rear wheels corresponding to the respective addresses have been stored according to a Table I shown below.

TABLE I

| ADDRESSES (Front Wheel Steered Angle Sf) | | DATA (Rear Wheel Reference Steering Angle Ar) | |
|---|---|---|---|
| +35° | ↑ | −5° | ↑ |
| . | ↑ | . | ↑ |
| . | ↑ | . | opposite to front wheels |
| . | right | . | ↑ |
| . | ↑ | . | ↑ |
| . | ↑ | 0 | neutral |
| . | ↑ | . | ↑ |
| . | ↑ | +1° | same as front wheels |
| . | ↑ | . | ↑ |
| 0 | neutral | 0 | neutral |
| . | ↓ | . | ↓ |
| . | ↓ | +1° | same as front wheels |
| . | ↓ | . | ↓ |
| . | ↓ | 0 | neutral |
| . | ↓ | . | ↓ |
| . | left | . | ↓ |
| . | ↓ | . | opposite to front wheels |
| . | ↓ | . | ↓ |
| −35° | ↓ | −5° | ↓ |

In an event that an 8 bit computer is employed in the microcomputer system 12, the maximum angle 35° to the right and the maximum angle 35° to the left, totally 70°, to be steered by the front wheels are divided into 256 angle segments according to 8 bit storage capacity of the employed computer.

$$70° \div 256 = 0.27°$$

Thus, addresses in the Table I are set per 0.27° of the steered angle Sf of the front wheels.

In the data part of the Table I, the reference steering angles Ar of the rear wheels corresponding to the steered angles Sf of the front wheels in the address part of the Table I are set within the angle range from neutral to +1° (in the same direction as the front wheels) and again to neutral and further to −5° (in the opposite direction to the front wheels) for either of the rightward or leftward steering to the front wheels.

Once an absolute address in the memory M1 has been determined from the signal d1 representing the turning state Ts of the vehicle by the steered angle Sf of the front wheels, then the corresponding data is read to determine a reference steering angle Ar of the rear wheels. This data on the angle Ar is given to the third process function P3 as a data signal d2. Thus, as indicated by the above example involving table I, operation routine O1 may simply involve the retrieval of predetermined appropriate values for data signal d2 from a memory array of the memory M1 using the input signal d1 from the turning state detector 13 as an address to the array.

In FIG. 2, the velocity derivative detector 14 has detected a velocity derivative Vd output as a detection signal d3 therefrom. The signal d3 is passed to a second process function P2 of the computer 12, where it is processed on the basis of data on various velocity derivatives stored in a memory M2, following an operation routine O2, to determine a corrective steering angle Ac of the rear wheels 11 corresponding to the detection signal d3. Then, data on the angle Ac are given in the form of a data signal d4 to be sent to the third process function P3 of the computer 12. The corrective steering angle Ac is given as a correction amount for additionally correcting, in accordance with the velocity derivative Vd, the position of the rear wheels 11, as they are steered by the reference steering angle Ar following the data signal d2, while the vehicle is turning.

Figure 7:
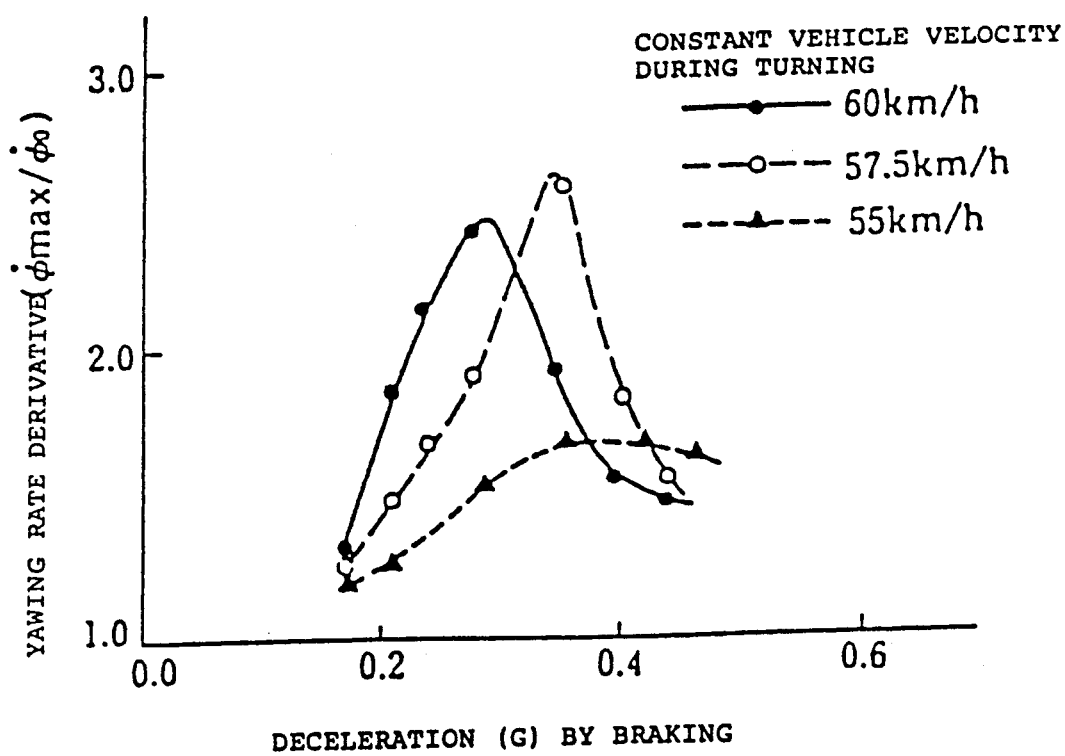
FIG. 7 is a graph showing a vehicle's yawing rate derivative in relation to its deceleration (G) by braking at various vehicle velocities during a turning operation.

With more particular regard to the second process function P2 of the computer, when the vehicle is in a decelerating state, because the derivatives of the yawing rate at a certain vehicle velocity differ from those at other vehicle velocities as shown in FIG. 7, deceleration values Vd to be stored in the address part of a second table (unshown) in the memory M2 and corrective steering angles Ac to be stored in the data part of the second table are determined by actually (experimentally) measuring the deceleration - yawing rate derivative characteristics at different velocities of the particular or given vehicle to which the present invention is applied. Consequently, in the second table in the memory M2, each time when the deceleration increases a predetermined amount, 0.05 G for example, the corrective steering angle Ac is given so that the ratio $\gamma$ of the steering angle of the rear wheels to that of the front wheels may increase a corresponding, predetermined amount, 0.01 for example. However, if the reference steering angle Ar is given to have the opposite direction to the front wheel steered angle Sf, the corrective steering angle Ac is always zero.

According to the second table in the memory M2 in this example, when the vehicle is in an accelerating state, an increase of acceleration up to 0.1 G will give the corrective steering angle Ac in such manner that the ratio $\gamma$ of the steering angle of the rear wheels to that of the front wheels decreases 0.01. However, if the reference steering angle Ar has a negative value, the corrective steering angle Ac will be zero.

Thus, as indicated by the above example involving the second table, operation routine O2 may also simply involve the retrieval of predetermined appropriate values for the data signal d4 from a memory array of the memory M2 using the input signal d3 from the velocity derivative detector 14 as an address to the array.

With respect to the foregoing description, as shown in FIG. 2 by broken line, the turning state detector 13 may have an output thereof passed also to the second process function P2, to thereby reconfirm the turning state of the vehicle, before giving the data signal d4.

At the third process function P3, the data signals d2 and d4 are processed, following an operation routine O3, to determine the rear wheel steering angle Sr by correcting the reference steering angle Ar by way of a subtraction therefrom of the corrective steering angle Ac. Then, data on the angle Sr are output in the form of the control signal D to the actuator 8. In other words, $Sr=Ar-Ac$ and, therefore, in the case where the rear wheels 11 are steered in the same direction as the front wheels 5, then $Sr=|Ar|-|Ac|$ when $Vd>0$ (accelerating state) or $Sr=|Ar|+|Ac|$ when $Vd>0$ and, where they are steered in the opposite direction thereto, then $Sr=-|Ar|-|Ac|$ when $Vd>0$ or $Sr=-|Ar|+|Ac|$ when $Vd<0$.

Incidentally, the corrective steering angle Ac may be assigned to have a negative (−) value for $Vd>0$ and a positive (+) value for $Vd<0$, and in such case, to determine the rear wheel steering angle Sr, the reference steering angle Ac may be corrected by way of an addition thereto of the corrective steering angle Ac.

Figure 3A:
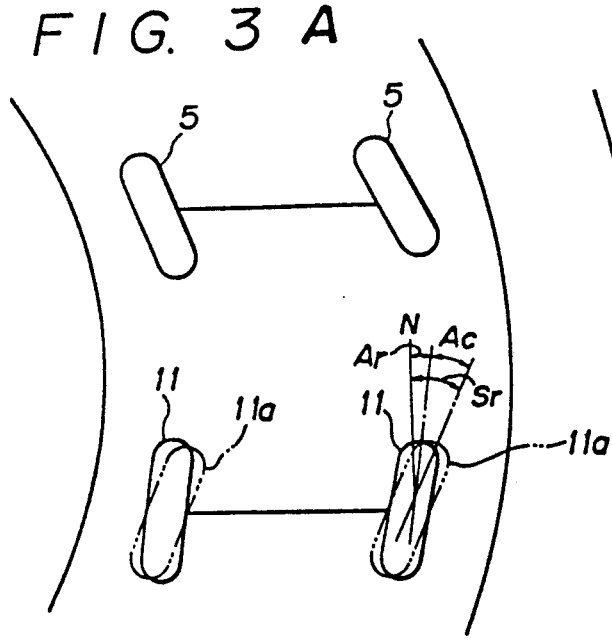
FIGS. 3A and 3B are plan views showing, for an accelerating state, the relation of steering angles between front and rear wheels being steered with the steering system of FIG. 1.
Figure 3B:
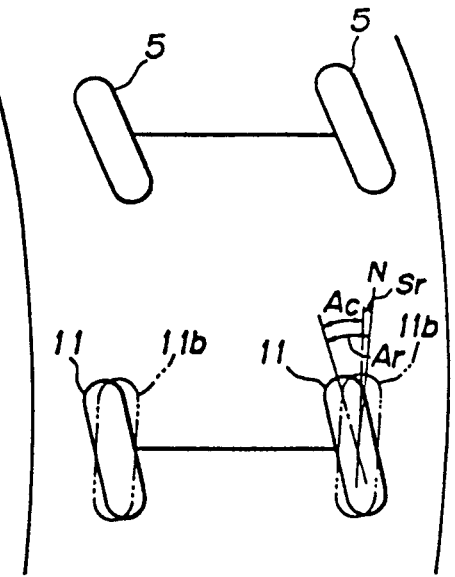

The above-described relations in the accelerating state are schematically illustrated in FIGS. 3A and 3B. FIG. 3A corresponds to the case of a negative value of the reference steering angle Ar, in which the rear wheels 11 are steered in the opposite direction to the front wheels 5, while FIG. 3B corresponds to the case of a positive value of the angle Ar, where the steering direction of the rear wheels 11 is the same as that of the front wheels 5. In FIGS. 3A and 3B, designated at reference character N is the neutral position of the rear wheel 11 at each side of the vehicle, which position corresponds to the straight travelling state of the vehicle. In FIG. 3A, the reference steering angle Ar is corrected by the corrective steering angle Ac in the opposite direction to the front wheels 5, thus resulting in a larger value of the rear wheel steering angle Sr, whereby the rear wheel 11 is steered into a position 11a more distant from the neutral position N than that by the reference steering angle Ar. On the other hand, in FIG. 3B, the reference steering angle Ar is corrected by the corrective steering angle Ac in the opposite direction to the front wheels 5, resulting this time in a smaller value of the rear wheel steering angle Sr, so that the rear wheel 11 is steered into a position 11b nearer to the neutral position N than that by the reference steering angle Ar. As shown in FIGS. 3A, 3B, the rear wheel 11 is corrected in the angle thereof in a direction which promotes the turning motion of the vehicle.

Figure 4A:
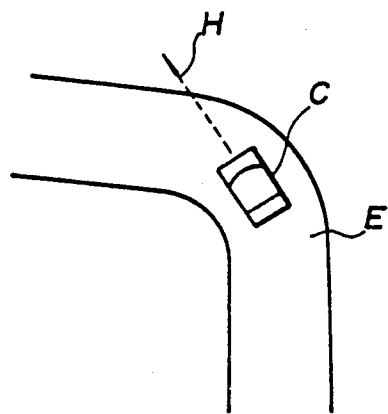
FIG. 4A is an overhead view for explaining the vision problems in the accelerating state attendant a vehicle with a conventional steering system when travelling along a curve.
Figure 4B:
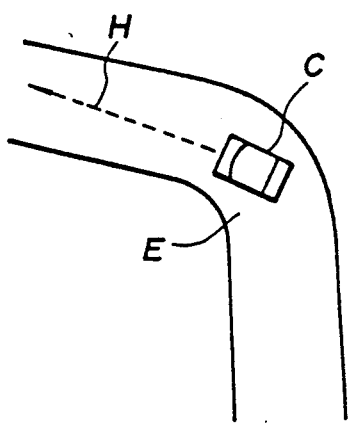
FIG. 4B is a view similar to FIG. 4A, illustrating the clearness of vision in the accelerating state attendant a vehicle with a steering system according to the invention when travelling along a curve.

As a result, as shown in FIG. 4B, when a vehicle C with a steering system according to the invention travels along a curve E, a driver (not shown) of the vehicle C has an improved sight direction H so as to facilitate obtaining a clear front view around the curve E in comparison with the case of a conventional steering system provided in the vehicle C, in which, as shown in FIG. 4A, the sight direction H affords only a blind front view over the curve E.

Figure 5A:
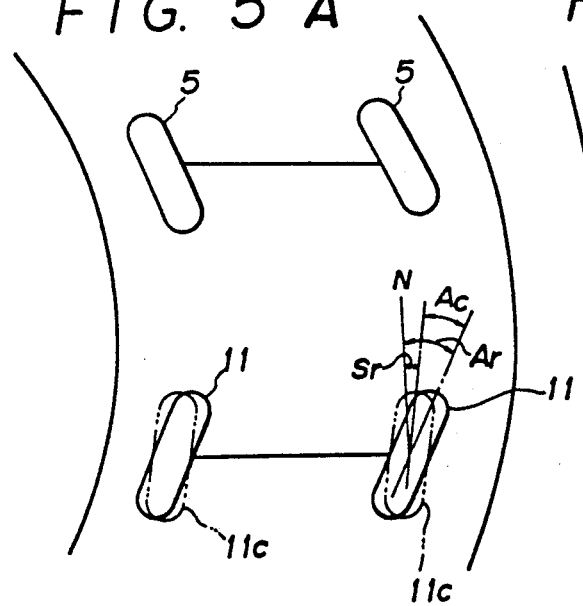
FIGS. 5A and 5B are plan views showing, for a decelerating state, the relation of steering angles between front and rear wheels being steered with the steering system of FIG. 1.
Figure 5B:
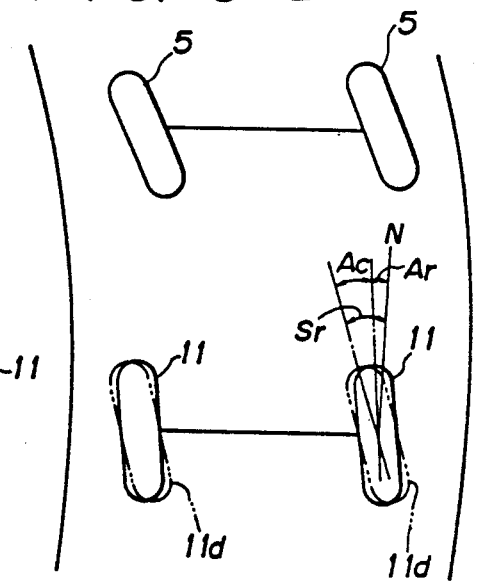

On the other hand, for the decelerating state, the before-described relations are schematically shown in FIGS. 5A and 5B. FIG. 5A corresponds to the case of a negative value of the reference steering angle Ar, in which the rear wheels 11 are steered in the opposite direction to the front wheels 5, while FIG. 5B corresponds to the case of a positive value of the angle Ar, where the steering direction of the rear wheels 11 is the same as that of the front wheels 5. In FIGS. 5A and 5B, designated at reference character N is the neutral position of the rear wheel 11 at the right side, which position corresponds to the straight travelling state of the vehicle. In FIG. 5A, the reference steering angle Ar is corrected by the corrective steering angle Ac in the same direction as the front wheels 5, thus resulting in a smaller value of the rear wheel steering angle Sr, whereby the rear wheel 11 is steered into a position 11c nearer to the neutral position N than that by the reference steering angle Ar. On the other hand, in FIG. 5B, the reference steering angle Ar is corrected by the corrective steering angle Ac in the same direction as the front wheels 5, resulting this time in a larger value of the rear wheel steering angle Sr, so that the rear wheel 11 is steered into a position 11d more distant from the neutral position N than that by the reference steering angle Ar. As shown in FIGS. 5A, 5B, the rear wheel 11 is corrected in the steered angle in a direction which opposes the turning motion of the vehicle, thus producing an increased lateral force to the rear wheel 11, whereby the fish-tailing motion is favorably prevented.

Figure 6:
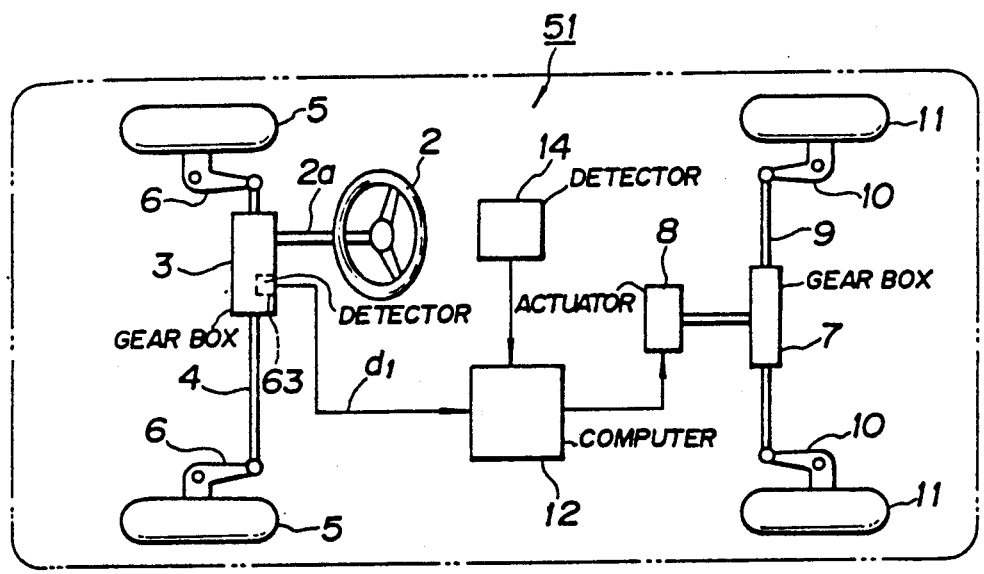
FIG. 6 is a plan view schematically showing the constitution of a steering system for vehicles according to a modified example of the above embodiment.

There will be described below a steering system 51 according to a modified example of the foregoing embodiment, with reference to FIG. 6. The modified example differs from the foregoing embodiment in that, as a turning state representative value Ts of a vehicle, there is employed a front wheel steering angle Sf detected by a front wheel steering angle detector 63 provided in a gear box 3 adapted for the steering of front wheels 5 of the vehicle, and that the front wheel steering angle Sf is input as a detection signal d1 to a computer 12.

In the foregoing embodiment, the velocity derivative detector 14 may comprise an acceleration sensor for detecting the velocity derivative Vd only in an accelerating state and/or a deceleration sensor for detecting the velocity derivative Vd only in a decelerating state. Moreover, there may be employed as the acceleration sensor any suitable element such as an acceleration pedal operation sensor for detecting an accelerating operation of a driver of the vehicle and further, as the deceleration sensor, any suitable element such as a braking operation sensor for detecting a decelerating operation of the driver. Furthermore, the data signal d4 representing the corrective steering angle Ac may be given only when the velocity derivative Vd is in an accelerating state or in a decelerating state.

Still more, although the angles Ar and Ac are employed to indicate a reference steering quantity and a corrective steering quantity of the rear wheels 11, respectively, they may be substituted by any other suitable parameter such as a steered angle ratio of the rear wheels 11 to the front wheels 5. Yet more, the corrective steering quantity may be given in the form of a correction coefficient relative to the reference steering quantity.

In addition, although a computer is mounted on the vehicle as means for processing the detection signals d1, d3 to obtain the control signal D, a similar effect may be achieved by use of an electric circuit.

Although there have been described what are at present considered to be the preferred embodiments of the invention, it will be understood that the present invention may be embodied in other specific forms without departing from the spirit of essential characteristics thereof. The present embodiments are therefore to be considered in all respects as illustrative and not restrictive. The scope of the invention is indicated by the appended claims rather than by the foregoing description.

We claim:

1. A steering system for a vehicle having front and rear steered wheels, comprising:
   means for detecting a turning state of the vehicle;
   means for detecting a velocity derivative of the vehicle;
   means for determining a steering angle for the vehicle's rear wheels dependent on output signals of said turning state detecting means and said velocity derivative detecting means; and
   means for driving the rear wheels to said steering angle as determined by said determining means;
   said determining means including means for providing a reference steering angle for the rear wheels dependent on the output signal from said turning state detecting means, and means for correcting said reference steering angle dependent on at least the output signal of said velocity derivative detecting means to establish said steering angle for the rear wheels; and
   said correcting means correcting said reference steering angle by way of a correction amount and a correction direction both corresponding to said velocity derivative.

2. A steering system according to claim 1, wherein:
   said correcting means corrects said reference steering angle in a correction direction which promotes turning of the vehicle when the detected velocity derivative is indicative of a vehicle accelerating state.

3. A steering system according to claim 1, wherein:
   said correcting means corrects said reference steering angle in a correction direction which opposes the turning of said vehicle when the detected velocity derivative is indicative of a vehicle decelerating state.

4. A steering system according to claim 1, wherein:
   said correction direction of said correction data is the same as the direction in which the front wheels are steered when the detected velocity derivative is indicative of a vehicle accelerating state and is opposite to the direction in which the front wheels are steered when the detected velocity derivative is indicative of a vehicle decelerating state.

5. A steering system according to claim 1, wherein:
   said reference steering angle pertains to a steering direction which is either the same or opposite to a steered direction of the vehicle's front wheels; and
   said correcting means does not correct said reference steering angle when the steering direction of said reference steering angle is opposite to the steered direction of the vehicle's front wheels.

* * * * *

UNITED STATES PATENT AND TRADEMARK OFFICE
CERTIFICATE OF CORRECTION

PATENT NO. : 5,010,971

DATED : April 30, 1991

INVENTOR(S) : Hamada et al

It is certified that error appears in the above-identified patent and that said Letters Patent is hereby corrected as shown below:

Column 5, line 61, after "involving the" insert --(unshown)--

Column 6, line 13, change "Vd>0" to --Vd<0--

Signed and Sealed this

Eighth Day of September, 1992

Attest:

DOUGLAS B. COMER

*Attesting Officer*          *Acting Commissioner of Patents and Trademarks*